United States Patent
Kamvar et al.

(10) Patent No.: US 9,235,637 B1
(45) Date of Patent: *Jan. 12, 2016

(54) SYSTEMS AND METHODS FOR GENERATING PREDICTED QUERIES AND CORRESPONDING SEARCH RESULTS

(75) Inventors: Sepandar D. Kamvar, Palo Alto, CA (US); Taher H. Haveliwala, Mountain View, CA (US); Glen M. Jeh, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,835

(22) Filed: Feb. 22, 2012

Related U.S. Application Data

(63) Continuation of application No. 12/916,330, filed on Oct. 29, 2010, now Pat. No. 8,156,109, which is a continuation of application No. 10/875,143, filed on Jun. 22, 2004, now Pat. No. 7,836,044.

(51) Int. Cl.
*G06F 17/30* (2006.01)
(52) U.S. Cl.
CPC .............................. *G06F 17/30646* (2013.01)
(58) Field of Classification Search
CPC .......... G06F 17/30864; G06F 17/3064; G06F 17/3097
USPC ........................................... 707/713, 999.003
See application file for complete search history.

(56) References Cited

U.S. PATENT DOCUMENTS

| 5,270,927 A | 12/1993 | Sproat |
| 5,649,222 A | 7/1997 | Mogilevsky |
| 5,687,364 A | 11/1997 | Saund et al. |
| 5,761,436 A | 6/1998 | Nielsen |

(Continued)

FOREIGN PATENT DOCUMENTS

| CN | 1670723 A | 9/2005 |
| CN | 101268463 A | 9/2008 |

(Continued)

OTHER PUBLICATIONS

Lempel et al., "Predictve Caching and Prefecthing of Query Results in Search Engines", May 2003, ACM 1-58113-680-3/03/0005, pp. 19-28.*

(Continued)

*Primary Examiner* — Tony Mahmoudi
*Assistant Examiner* — Michael Le
(74) *Attorney, Agent, or Firm* — Morgan, Lewis & Bockius LLP

(57) ABSTRACT

A search system monitors the input of a search query by a user. Before the user finishes entering the search query, the search system identifies and sends a portion of the query as a partial query to the search engine. Based on the partial query, the search engine creates a set of predicted queries. This process may take into account prior queries submitted by a community of users, and may take into account a user profile. The predicted queries are to be sent back to the user for possible selection. The search system may also cache search results corresponding to one or more of the predicted queries in anticipation of the user selecting one of the predicted queries. The search engine may also return at least a portion of the search results corresponding to one or more of the predicted queries.

27 Claims, 11 Drawing Sheets

(56) References Cited

U.S. PATENT DOCUMENTS

| | | |
|---|---|---|
| 5,805,911 A | 9/1998 | Miller |
| 5,845,300 A | 12/1998 | Comer et al. |
| 5,873,107 A | 2/1999 | Borovoy et al. |
| 5,892,919 A | 4/1999 | Nielsen |
| 5,907,680 A | 5/1999 | Nielsen |
| 5,920,854 A | 7/1999 | Kirsch et al. |
| 5,954,798 A | 9/1999 | Shelton et al. |
| 5,995,928 A | 11/1999 | Nguyen et al. |
| 6,006,225 A | 12/1999 | Bowman et al. |
| 6,032,162 A | 2/2000 | Burke |
| 6,037,934 A | 3/2000 | Himmel et al. |
| 6,041,360 A | 3/2000 | Himmel et al. |
| 6,067,565 A | 5/2000 | Horvitz |
| 6,096,096 A | 8/2000 | Murphy et al. |
| 6,105,018 A * | 8/2000 | Demers ............. G06F 17/30312 |
| 6,125,361 A | 9/2000 | Chakrabarti et al. |
| 6,144,958 A | 11/2000 | Ortega et al. |
| 6,199,986 B1 | 3/2001 | Williams et al. |
| 6,243,071 B1 | 6/2001 | Shwarts et al. |
| 6,278,449 B1 | 8/2001 | Sugiarto et al. |
| 6,281,886 B1 | 8/2001 | Ranieri |
| 6,321,228 B1 | 11/2001 | Crandall et al. |
| 6,324,566 B1 | 11/2001 | Himmel et al. |
| 6,356,908 B1 | 3/2002 | Brown et al. |
| 6,377,965 B1 | 4/2002 | Hachamovitch et al. |
| 6,393,389 B1 | 5/2002 | Chanod et al. |
| 6,411,948 B1 | 6/2002 | Hetherington et al. |
| 6,493,702 B1 | 12/2002 | Adar et al. |
| 6,546,388 B1 | 4/2003 | Edlund et al. |
| 6,546,393 B1 | 4/2003 | Khan |
| 6,564,213 B1 | 5/2003 | Ortega et al. |
| 6,598,051 B1 | 7/2003 | Wiener et al. |
| 6,631,496 B1 | 10/2003 | Li et al. |
| 6,647,383 B1 | 11/2003 | August et al. |
| 6,687,689 B1 | 2/2004 | Fung et al. |
| 6,704,727 B1 | 3/2004 | Kravets |
| 6,708,250 B2 | 3/2004 | Gillingham |
| 6,735,592 B1 | 5/2004 | Neumann |
| 6,751,606 B1 | 6/2004 | Fries et al. |
| 6,778,979 B2 | 8/2004 | Grefenstette et al. |
| 6,801,659 B1 | 10/2004 | O'Dell |
| 6,819,336 B1 | 11/2004 | Nielsen |
| 6,832,218 B1 | 12/2004 | Emens et al. |
| 6,876,997 B1 | 4/2005 | Rorex et al. |
| 6,956,968 B1 | 10/2005 | O'Dell et al. |
| 7,031,961 B2 | 4/2006 | Pitkow et al. |
| 7,111,000 B2 | 9/2006 | Wen et al. |
| 7,124,129 B2 | 10/2006 | Bowman et al. |
| 7,139,973 B1 * | 11/2006 | Kirkwood ............ G06F 17/2229 707/E17.12 |
| 7,149,970 B1 | 12/2006 | Pratley et al. |
| 7,152,059 B2 | 12/2006 | Monteverde |
| 7,152,064 B2 | 12/2006 | Bourdoncle et al. |
| 7,181,438 B1 | 2/2007 | Szabo |
| 7,181,447 B2 | 2/2007 | Curtis et al. |
| 7,188,304 B2 | 3/2007 | Morimoto et al. |
| 7,216,290 B2 | 5/2007 | Goldstein et al. |
| 7,225,187 B2 * | 5/2007 | Dumais ............. G06F 17/30613 |
| 7,293,231 B1 | 11/2007 | Gunn et al. |
| 7,395,203 B2 | 7/2008 | Wu et al. |
| 7,437,364 B1 * | 10/2008 | Fredricksen ...... G06F 17/30011 |
| 7,467,131 B1 * | 12/2008 | Gharachorloo ... G06F 17/30902 |
| 7,626,574 B2 | 12/2009 | Kim |
| 7,660,815 B1 | 2/2010 | Scofield et al. |
| 7,689,540 B2 | 3/2010 | Chowdhury et al. |
| 7,747,639 B2 | 6/2010 | Kasperski et al. |
| 7,752,326 B2 | 7/2010 | Smit |
| 7,801,896 B2 | 9/2010 | Szabo |
| 7,844,590 B1 | 11/2010 | Zwicky et al. |
| 7,890,526 B1 | 2/2011 | Brewer et al. |
| 7,941,762 B1 | 5/2011 | Tovino et al. |
| 7,966,003 B2 | 6/2011 | Longe et al. |
| 8,005,919 B2 | 8/2011 | Mehanna et al. |
| 8,060,639 B2 | 11/2011 | Smit et al. |
| 8,069,028 B2 | 11/2011 | Scott et al. |
| 8,112,529 B2 | 2/2012 | van den Oord et al. |
| 8,312,032 B2 | 11/2012 | Choi et al. |
| 8,395,586 B2 | 3/2013 | Fux et al. |
| 2001/0047355 A1 | 11/2001 | Anwar |
| 2002/0023145 A1 | 2/2002 | Orr et al. |
| 2002/0032772 A1 * | 3/2002 | Olstad ............... G06F 17/30864 709/224 |
| 2002/0078045 A1 | 6/2002 | Dutta |
| 2002/0158779 A1 | 10/2002 | Ouyang |
| 2002/0174145 A1 | 11/2002 | Duga et al. |
| 2002/0187815 A1 | 12/2002 | Deeds et al. |
| 2003/0014403 A1 * | 1/2003 | Chandrasekar ..... G06F 17/3064 |
| 2003/0023582 A1 | 1/2003 | Bates et al. |
| 2003/0037050 A1 | 2/2003 | Monteverde |
| 2003/0041147 A1 | 2/2003 | van den Oord et al. |
| 2003/0135725 A1 | 7/2003 | Schirmer et al. |
| 2003/0143979 A1 | 7/2003 | Suzuki et al. |
| 2003/0145087 A1 | 7/2003 | Keller et al. |
| 2003/0179930 A1 | 9/2003 | O'Dell et al. |
| 2003/0212563 A1 | 11/2003 | Ju et al. |
| 2003/0216930 A1 * | 11/2003 | Dunham ................ G06Q 30/02 705/26.1 |
| 2003/0220913 A1 | 11/2003 | Doganata et al. |
| 2004/0010520 A1 | 1/2004 | Tsang et al. |
| 2004/0064577 A1 | 4/2004 | Dahlin et al. |
| 2004/0205501 A1 | 10/2004 | Gupta |
| 2004/0230574 A1 | 11/2004 | Kravets |
| 2004/0254928 A1 | 12/2004 | Vronay et al. |
| 2005/0080771 A1 | 4/2005 | Fish |
| 2005/0149507 A1 | 7/2005 | Nye |
| 2005/0203878 A1 | 9/2005 | Brill et al. |
| 2005/0210383 A1 | 9/2005 | Cucerzan et al. |
| 2005/0246211 A1 | 11/2005 | Kaiser |
| 2005/0256846 A1 | 11/2005 | Zigmond et al. |
| 2005/0283468 A1 | 12/2005 | Kamvar et al. |
| 2006/0106769 A1 | 5/2006 | Gibbs |
| 2006/0195435 A1 | 8/2006 | Laird-McConnell |
| 2006/0224871 A1 | 10/2006 | Tran |
| 2006/0259479 A1 | 11/2006 | Dai |
| 2007/0050352 A1 | 3/2007 | Kim |
| 2007/0100890 A1 | 5/2007 | Kim |
| 2007/0143262 A1 | 6/2007 | Kasperski |
| 2007/0156677 A1 | 7/2007 | Szabo |
| 2007/0288648 A1 | 12/2007 | Mehanna et al. |
| 2008/0040323 A1 | 2/2008 | Joshi |
| 2008/0201227 A1 | 8/2008 | Bakewell et al. |
| 2009/0119289 A1 | 5/2009 | Gibbs et al. |
| 2011/0258183 A1 | 10/2011 | Gibbs et al. |
| 2011/0271095 A1 | 11/2011 | Bharat et al. |
| 2011/0314021 A1 | 12/2011 | Gibbs et al. |

FOREIGN PATENT DOCUMENTS

| | | |
|---|---|---|
| EP | 1359516 A2 | 5/2003 |
| JP | 10-141970 A | 5/1998 |
| JP | 2001-249933 A | 9/2001 |
| WO | WO 00/57265 | 9/2000 |
| WO | WO 2005/033967 | 4/2005 |
| WO | WO 2006/055120 | 5/2006 |
| WO | WO 2009/021204 | 2/2009 |

OTHER PUBLICATIONS

Anick, *The Paraphrase Search Assistant: Terminological Feedback for Iterative Information Seeking*, SIGIR'99, Berkeley, CA, Aug. 1999, pp. 153-159.

Cruz, *A User Interface for Distributed Multimedia Database Querying with Mediator Supported Refinement*, Department of Computer Science—ADVIS Research Group, Worcester Polytechnic Institute, Worcester, MA, Aug. 1999, 9 pages.

Google Web Search Help, *Google Suggest*, www.google.com/support/websearch/bin/answer.py?answer=106230, downloaded Jun. 17, 2010, 2 pages.

Hoong, *Guided Google: A Meta Search Engine and its Implementation using the Google Distributed Web Services*, Grid Computing and Distributed Systems (GRIDS) Laboratory, Department of Computer Science and Software Engineering, The University of Melbourne, Australia, Feb. 13, 2003, 8 pages.

(56) References Cited

OTHER PUBLICATIONS

International Preliminary Report on Patentability, PCT/US2006/062651, Jul. 1, 2008, 7 pages.
International Search Report and Written Opinion, PCT/US2006/062651, Mar. 21, 2007, 11 pages.
Koester, *Conceptual Knowledge Processing with Google*, Proceedings of the LWA 2005, Saarbrucken, Germany, Oct. 2005, 6 pages.
Kolvenbach, *A Toolbar for Efficient Interaction in Online Communities*, Proceedings of the 31st EUROMICRO Conference on Software Engineering and Advanced Applications, Porto, Portugal, Aug. 30-Sep. 3, 2005, 8 pages.
Lam, Automatic Text Categorization and Its Application to Text Retrieval, IEEE Transactions on Knowledge and Data Engineering, vol. 11, No. 6, Nov./Dec. 1999, pp. 865-879.
Penas, *Browsing by Phrases: Terminological Information in Interactive Multilingual Text Retrieval*, JCDL'01, Roanoke, VA, Jun. 24-28, 2001, pp. 253-254.
Richardson, *Mac User Makes Auto Complete Search Function for Safari*, WebProNews, Jul. 19, 2005, 2 pages.
Varghese, *Google Suggest comes online*, The Sydney Morning Herald, Dec. 15, 2004, 1 page.
Watanabe, *DWBlog—Inquisitor* 1.0, www.newsfirex.com/blog/?p-47, Jun. 28, 2010, 4 pages.
No author, Partial and Full URL's, http://maps.fsl.noaa.gov/moniger/web101/1-lecture/partail.html, 1996, p. 1.
International Search Report and Written Opinion for PCT/US2005/036553 dated May 11, 2006, 12 pgs.
International Search Report and Written Opinion for PCT/US2009/048668 dated Jan. 27, 2010, 12 pgs.
Gery, Evaluation of Web Usage Mining Approaches for User's Next Request Prediction, WIDM '03, Nov. 7-8, 2003, pp. 74-81.
Lempel, Predictive Caching and Prefetching of Query Results in Search Engines, WWW2003, May 20-24, 2003, 10 pgs.
Wang, An Approach Toward Web Caching and Prefetching for Database Management System, 2001, 9 pgs.
Google Inc., International Search Report and Written Opinion, PCT/US2008/072678, Apr. 9, 2009, 10 pgs.
Google Inc., Office Action, Chinese Patent Application No. 200880110208.1, Jul. 26, 2011, 10 pgs.
Google Inc., Office Action, Japanese Patent Application No. 2007-541185, Nov. 2, 2011, 2 pgs.
Google Inc., Notice of Final Rejection, KR 2007-7013174, Dec. 26, 2012, 4 pgs.
Google Inc., Notice of the Result of the Re-examination Prior to Trial, KR 10-2007-7013174, May 30, 2013, 3 pgs.
Kamvar, Amendment, U.S. Appl. No. 13/402,840, Apr. 10, 2013, 9 pgs.
Djabarov, Amendment After Final, U.S. Appl. No. 11/321,075, Oct. 7, 2010, 30 pgs.
Djabarov, Amendment After Final, U.S. Appl. No. 11/321,075, Jun. 25, 2009, 51 pgs.
Djabarov, Amendment, U.S. Appl. No. 11/321,075, Feb. 12, 2009, 39 pgs.
Djabarov, Amendment, U.S. Appl. No. 11/321,075, Mar. 25, 2010, 40 pgs.
Djabarov, Amendment, U.S. Appl. No. 11/321,075, Jul. 30, 2008, 45 pgs.
Gibbs, Amendment After Allowance, U.S. Appl. No. 13/243,668, May 31, 2012, 7 pgs.
Gibbs, Amendment, U.S. Appl. No. 10/987,294, Aug. 6, 2007, 20 pgs.
Gibbs, Amendment, U.S. Appl. No. 10/987,295, Aug. 6, 2007, 21 pgs.
Gibbs, Amendment, U.S. Appl. No. 10/987,769, Sep. 8, 2009, 19 pgs.
Gibbs, Amendment, U.S. Appl. No. 10/987,769, Aug. 21, 2008, 23 pgs.
Gibbs, Amendment, U.S. Appl. No. 12/345,564, Apr. 18, 2011, 16 pgs.
Gibbs, Amendment, U.S. Appl. No. 12/360,076, Mar. 28, 2011, 8 pgs.
Gibbs, Amendment, U.S. Appl. No. 13/167,591, Feb. 22, 2012, 11 pgs.
Gibbs, Appellant's Brief, U.S. Appl. No. 10/987,769, Jun. 28, 2010, 37 pgs.
Gibbs, Appellant's Brief, U.S. Appl. No. 12/345,564, Oct. 31, 2011, 24 pgs.
Gibbs, Appellant's Reply Brief, U.S. Appl. No. 12/345,564, Feb. 16, 2012, 13 pgs.
Gibbs, Reply Brief, U.S. Appl. No. 10/987,769, Nov. 16, 2010, 9 pgs.
Gibbs, Response to Final Office Action, U.S. Appl. No. 10/987,294, Jan. 14, 2008, 11 pgs.
Gibbs, Response to Final Office Action, U.S. Appl. No. 10/987,295, May 12, 2008, 13 pgs.
Gibbs, Response to Final Office Action, U.S. Appl. No. 10/987,295, Jan. 14, 2008, 13 pgs.
Gibbs, Response to Final Office Action, U.S. Appl. No. 10/987,769, Mar. 1, 2010, 19 pgs.
Gibbs, Response to Final Office Action, U.S. Appl. No. 10/987,769, Mar. 26, 2009, 22 pgs.
Gibbs, Response to Final Office Action, U.S. Appl. No. 12/345,564, Aug. 1, 2011, 13 pgs.
Gibbs, Response to Office Action, U.S. Appl. No. 10/987,294, Sep. 12, 2008, 17 pgs.
Gibbs, Response to Office Action, U.S. Appl. No. 10/987,295, Sep. 12, 2008, 15 pgs.
Gibbs, Supplemental Response to Final Office Action, U.S. Appl. No. 10/987,294, May 12, 2008, 13 pgs.
Gibbs, Supplemental Response to Final Office Action, U.S. Appl. No. 10/987,769, Mar. 23, 2010, 17 pgs.
Gibbs, Supplemental Response to Final Office Action, U.S. Appl. No. 12/345,564, Aug. 5, 2011, 13 pgs.
Google Inc., Notice to File a Response, Korean Patent Application, 2007-7013174, Jun. 1, 2012, 6 pgs.
Kamvar, Amendment, U.S. Appl. No. 10/875,143, Jan. 9, 2008, 11 pgs.
Kamvar, Amendment, U.S. Appl. No. 10/875,143, Aug. 28, 2008, 12 pgs.
Kamvar, Amendment, U.S. Appl. No. 12/916,330, Oct. 4, 2011, 7 pgs.
Kamvar, Amendment, U.S. Appl. No. 13/245,701, Apr. 23, 2012, 7 pgs.
Kamvar, Office Action, U.S. Appl. No. 13/402,835, Oct. 10, 2012, 24 pgs.
Kamvar, Preliminary Amendment, U.S. Appl. No. 12/916,330, Apr. 22, 2011, 6 pgs.
Kamvar, Response to Final Office Action, U.S. Appl. No. 10/875,143, Mar. 9, 2009, 11 pgs.
Kamvar, Response to Office Action, U.S. Appl. No. 10/875,143, Sep. 22, 2009, 13 pgs.
Kamvar, Response to Office Action, U.S. Appl. No. 10/875,143, Mar. 29, 2010, 16 pgs.
Kamvar, Supplemental Amendment, U.S. Appl. No. 10/875,143, Apr. 8, 2009, 10 pgs.
Kim, Amendment, U.S. Appl. No. 12/188,163, Jun. 17, 2011, 15 pgs.
Kim, Appellant's Brief, U.S. Appl. No. 12/188,163, Apr. 9, 2012, 34 pgs.
Kim, Response to Final Office Action, U.S. Appl. No. 12/188,163, Jan. 6, 2012, 12 pgs.
Google Inc., Notice of Reasons for Rejection, JP 2012-046492, Jun. 20, 2013, 4 pgs.
Google Inc., Decision of Rejection, CN 201080032696.6, May 29, 2014, 10 pgs.
Google Inc., International Search Report and Written Opinion, PCT/CN2010/073498, Sep. 9, 2010, 9 pgs.
Google Inc., Notice to File a Response, KR 2010-7005258, Jun. 20, 2014, 7 pgs.
Google Inc., Notification of the First Office Action, CN 201080032696.6, Feb. 16, 2013, 10 pgs.
Google Inc., Notification of the Second Office Action, CN 201080032696.6, Sep. 13, 2013, 8 pgs.
Kamvar, Amendment and Substance of Interview, U.S. Appl. No. 13/402,840, Apr. 17, 2014, 11 pgs.

(56) References Cited

OTHER PUBLICATIONS

Ko, Amendment and Substance of Interview, U.S. Appl. No. 13/376,364, Jul. 7, 2014, 10 pgs.

Gibbs, Amendment, U.S. Appl. No. 14/035,831, Nov. 17, 2014, 18 pgs.

Gibbs, Appellant's Brief, U.S. Appl. No. 14/035,831, Jul. 9, 2015, 34 pgs.

Gibbs, Response to Final OA, U.S. Appl. No. 14/035,831, Mar. 16, 2015, 18 pgs.

Kamvar, Response to Final OA, U.S. Appl. No. 13/402,840, Feb. 2, 2015, 9 pgs.

Kamvar, Response to Final OA, U.S. Appl. No. 13/402,840, Jan. 29, 2014, 8 pgs.

Kamvar, Response to OA, U.S. Appl. No. 13/402,840, Jul. 10, 2015, 10 pgs.

* cited by examiner

SYSTEMS AND METHODS FOR GENERATING PREDICTED QUERIES AND CORRESPONDING SEARCH RESULTS

RELATED APPLICATION

This application is a continuation of U.S. patent application Ser. No. 12/916,330, filed Oct. 29, 2010 now U.S. Pat. No. 8,156,109, entitled "Anticipated Query Generation and Processing in a Search Engine," which is a continuation of U.S. patent application Ser. No. 10/875,143, filed Jun. 22, 2004, entitled "Anticipated Query Generation and Processing in a Search Engine," (now U.S. Pat. No. 7,836,044), which applications are incorporated by reference herein in their entirety.

FIELD OF THE INVENTION

The present invention relates generally to the field of search engines for locating documents in a computer network system, and in particular, to a system and method for speeding up a desired search by anticipating a user's request.

BACKGROUND OF THE INVENTION

Search engines provide a powerful tool for locating documents in a large database of documents, such as the documents on the World Wide Web (WWW) or the documents stored on the computers of an Intranet. The documents are located in response to a search query submitted by a user. A search query may consist of one or more search terms.

In one approach to entering queries, the user enters the query by adding successive search terms until all search terms are entered. Once the user signals that all of the search terms of the query are entered, the query is sent to the search engine. The user may have alternative ways of signaling completion of the query by, for example, entering a return character by pressing the enter key on a keyboard or by clicking on a "search" button on the screen. Once the query is received, the search engine processes the search query, searches for documents responsive to the search query, and returns a list of documents to the user.

Because the query is not sent to the query processor until the query is completed, time passes while the user is building the full search query. It would be desirable to have a system and method of speeding up this process.

SUMMARY

A search system monitors the input of a search query by a user. Before the user finishes entering the search query, the search system identifies and sends a portion of the query as a partial query to the search engine. Based on the partial query, the search engine creates a set of predicted queries. This process may take into account prior queries submitted by a community of users, and may take into account a user profile. The predicted queries are be sent back to the user for possible selection. The search system may also cache search results corresponding to one or more of the predicted queries in anticipation of the user selecting one of the predicted queries. The search engine may also return at least a portion of the search results corresponding to one or more of the predicted queries.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF EMBODIMENTS

In an embodiment of the invention, portions of a user's query may be transmitted to a search engine before the user has finished entering the complete query. The search engine may use the transmitted portions of the query to predict the user's final query. These predictions may be sent back to the user. If one of the predictions is what the user had intended the query to be, then the user can select that predicted query without having to complete entry of the query.

Figure 1:
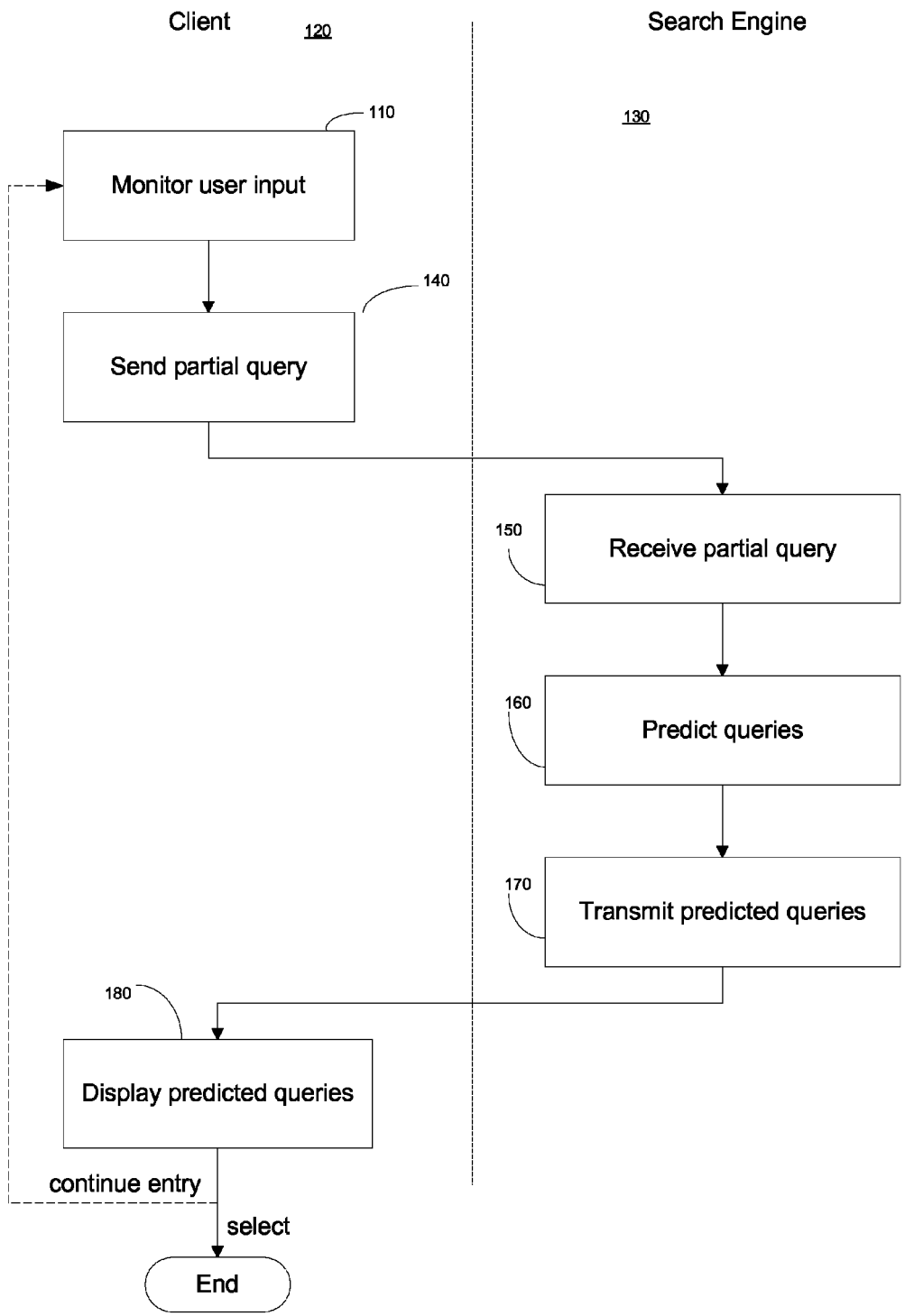
FIG. 1 is a flow chart of a query entry and handling process.

FIG. 1 illustrates an exemplary embodiment of the invention including a client system 120 and a search engine 130. As a user enters the search query, the input is monitored by the client system (stage 110). Prior to the user signaling completion of the search query, a portion of the user's query is sent from the client system 120 to the search engine 130 (stage 140). The portion of the query may be a few characters, a search term, or more than one search term. The search engine 130 receives the partial query for processing (stage 150) and makes predictions of what the user's contemplated query might be (stage 160). The search engine 130 may use a dictionary to assist in making the predictions. The dictionary may be created using previously entered search queries received by the search engine 130. The previous queries may include search queries from a community of users. The predicted queries are sent back to the client system 120 (stage 170) and then presented to the user (stage 180). If one of the predicted queries is what the user intended as the desired query, the user may select this predicted query and proceed without having to finish entering the desired query. If the predicted queries do not reflect what the user had in mind, then the user may continue to enter more of the desired search query.

Figure 2:
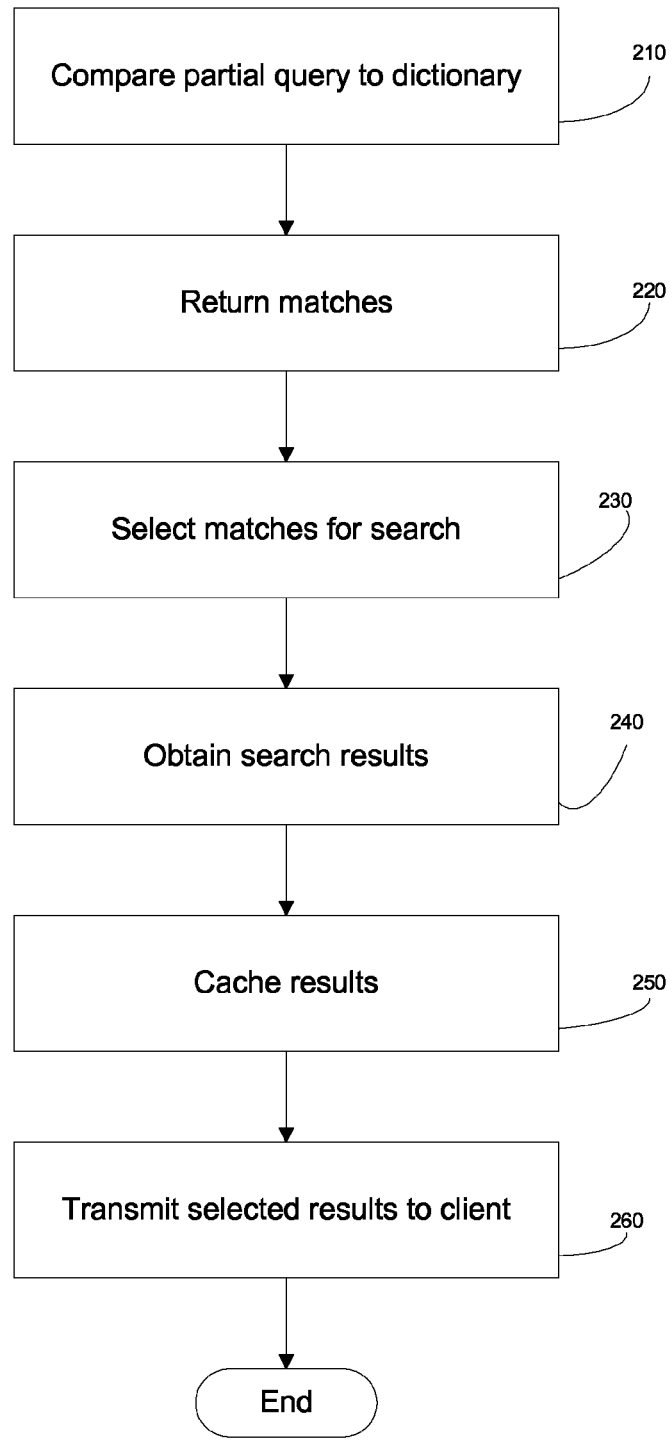
FIG. 2 is a flow chart of a process for handling a partial query.

In another embodiment of the invention, predicted search results are obtained and may be presented to the user prior to the user signaling that the complete query has been entered. In this embodiment, the portion of the search query received at stage 150 may be compared against the entries of the dictionary as illustrated in FIG. 2 (stage 210). As a result of comparing the partial query against the dictionary, entries in the dictionary matching the partial search query are then returned (stage 220). Various criteria may be used for identifying matching entries when a partial query is compared against the dictionary, as described below. It may be desired that not all of the matches be further processed. In that case, one or more matches from the set of returned matches may be chosen to have search results obtained for them (stage 230). The search results obtained (stage 240) may then be cached in memory for later access (stage 250). In some embodiments, search results are obtained only for the top N matches, where N is a predefined positive integer. In some embodiments, one or more caches of stored search results are checked prior to generating such search results, so as to avoid regenerating search results that have already been cached.

If it is desired that the search results be returned to the user, then results are transmitted to the client system 120 (stage 260), and may be presented to the user while the user is still entering the complete query. It may be that one of the search results for the predicted query satisfies the user's intended query. If so, the search engine 130 has, in effect, reduced the latency of a search from a user's perspective to zero.

Figure 3:
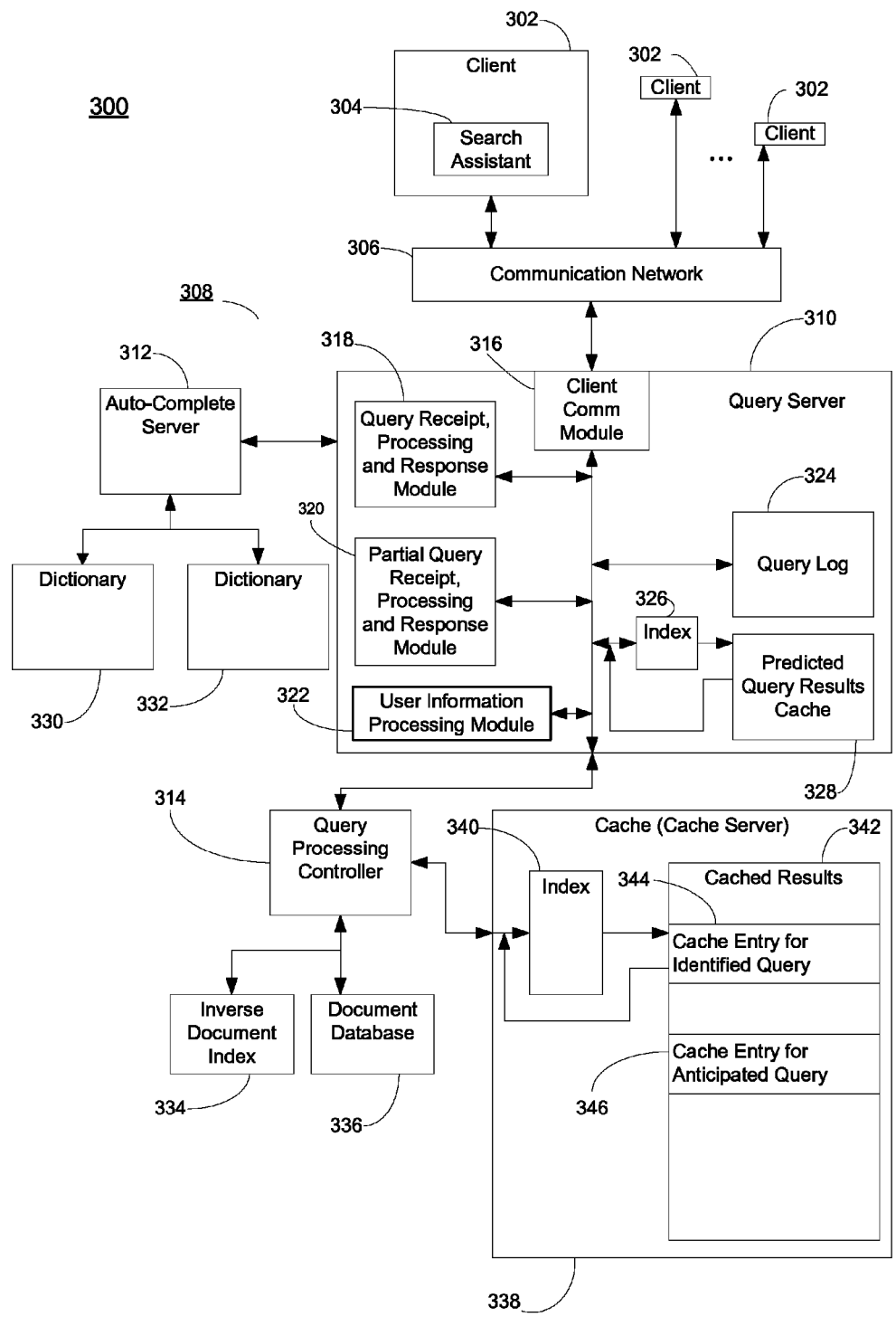
FIG. 3 is a block diagram of a client system 120 and a search engine 130.

FIG. 3 illustrates a searching system 300 according to an embodiment of the invention showing various functional components which will be referred to in the detailed discussions which follow. The searching system 300 may include one or more client systems 302. Each client system 302 may have a search assistant 304. The client systems 302 are connected to a communications network 306. The communications network 306 is connected between the client systems 302 and a search engine 308. Search engine 308 includes a query server 310 connected to the communications network 306, an auto-complete server 312, and a query processing controller 314.

A query server 310 includes a client communications module 316, a query receipt, processing and response module 318, a partial query receipt, processing and response module 320, a user information processing module 322, a query log 324, an index 326, and a predicted query results cache 328, all interconnected. In some embodiments, a results cache 328 is not included. In some embodiments, fewer and/or additional modules or functions are included in the query server 310. The modules shown in FIG. 3 as being part of query server 310 represent functions performed in an exemplary embodiment.

An auto-complete server 312 is connected to dictionary 330 and to dictionary 332. Although illustrated as connected to only two dictionaries, one of ordinary skill in the art will recognize any number of dictionaries could be present and connected as will be described below.

The query processing controller 314 is connected to an inverse document index 334, and document database 336, and a query cache 338. The cache 338 may include an index 340 the function of which is to locate entries in the cached results 342. The cached results may include a cache entry for an identified query 344 and a cache entry for an anticipated query 346. The index 334 and document database 336 are sometimes collectively called the document database. In some embodiments, "searching the document database" means searching the inverse document index 334 to identify documents matching a specified search query or term.

Although illustrated as discrete blocks in the figure, FIG. 3 is intended more as a functional description of an embodiment of the invention rather than a structural mapping of the functional elements. One of ordinary skill in the art would recognize that an actual implementation might have the functional elements grouped or split among various components.

Figure 4:
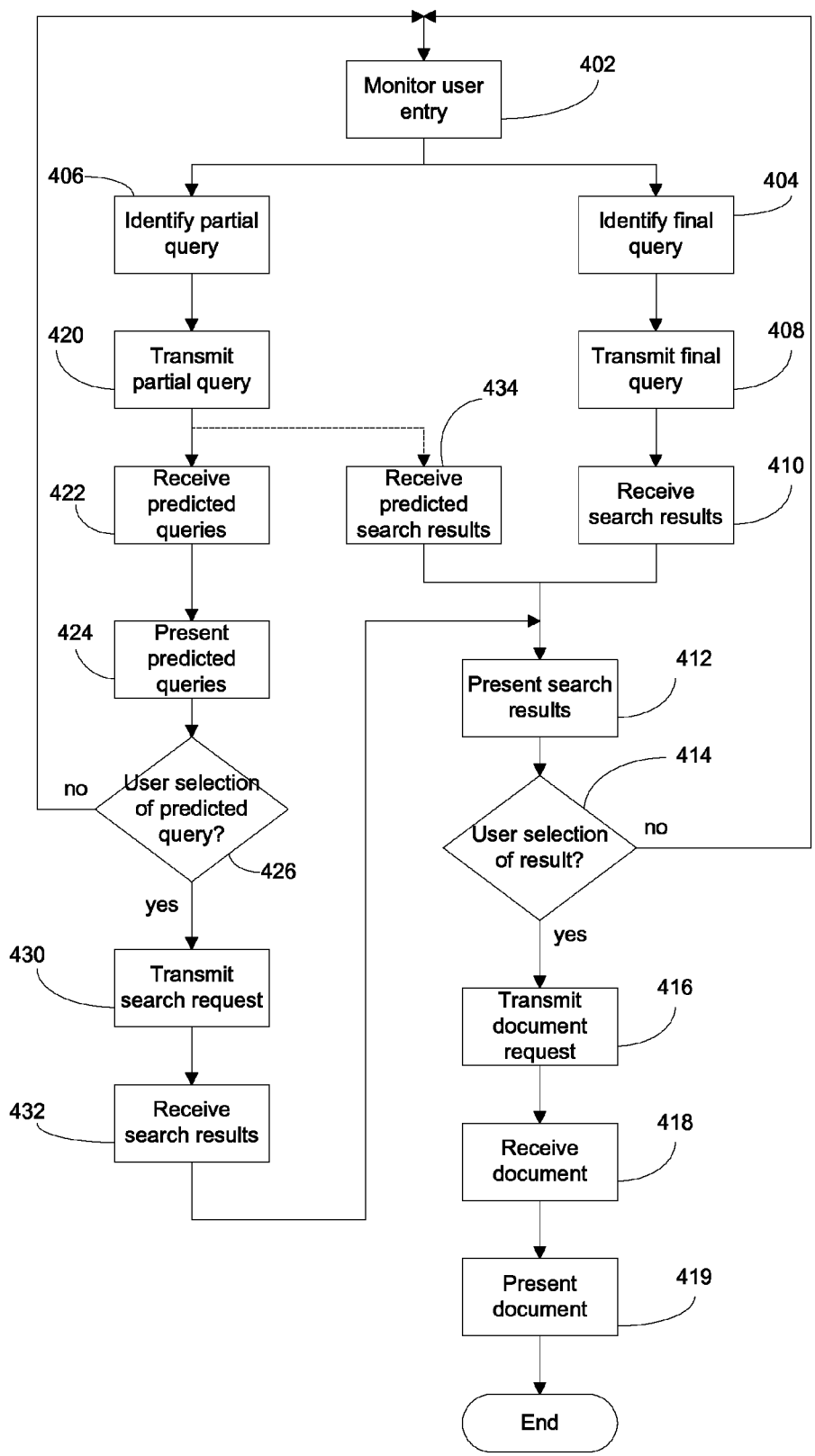
FIG. 4 is a flow chart of tasks handled by a search assistant in a client.

FIG. 4 illustrates an embodiment of the invention that may be implemented in the search assistant 304. The search assistant 304 monitors the user's entry of a search query on the client system 120 (stage 402). The user may enter a search query in a number of ways including a browser window, a search tool, or any other input mechanism. The search assistant 304 may identify either a final search query (stage 402) or a partial query (stage 406).

A final search query may be identified by the search assistant 304 in a number of ways such as when the user enters a carriage return, or equivalent character, selects a search button presented to the user during entry of the search query, or by possibly selecting one of a set of possible queries presented to the user during entry of the search query. One of ordinary skill in the art would recognize a number of ways to signal the final entry of the search query. Once the final search query has been identified (stage 404), the search query is transmitted to the search engine 308 (stage 408) for processing and return of search results. After the search results generated from the query are received (stage 410), they are presented to the user such that the user may select one of the documents for further examination (stage 412). For example, the search results could be visually or audibly presented to the user. One of ordinary skill in the art would recognize a number of ways to present the search results to the user for potential selection.

If the user does not select any of the presented search results (stage 414), then the user may begin to enter another search request and monitoring will begin again (stage 402). If, on the other hand, the user selects one of the presented results (stage 414), the document is requested from its host (e.g., a host web server or host document server) (or from the search engine 308) for further examination by the user (stage 416). The document is received from the host or the search engine 130 (stage 418) and then presented to the user (stage 419). Presentation of the document may be similar to, or different from, presentation of the search results (stage 412) (e.g., visually or audibly).

The stages described above follow when the user signals that the query is complete. Prior to the end of the entry of the search query, however, a partial query may be identified (stage 406). A partial query may be identified in a number of ways. A partial query might include a single search term of the search query, multiple search terms, or it might include a number of characters of a search term.

One embodiment of the invention may include identifying a search term by detecting entry of a space character or other search term delimiting character (e.g., without limitation, a quote character, or a parenthesis character). Entry of a delimiting character may indicate that a user has finished entering a desired search term and is moving onto the next search term.

Another embodiment may include identifying a partial query by entry of a pre-determined number of characters. In this embodiment, it may be that a search term contains a number of characters and it is desirable to identify a partial query before the user has entered all of the characters. This technique may be desirable, for example, if the search term contains a large number of characters or if the pre-determined number of characters is large enough to result in useful predictions.

Yet another embodiment might include identifying a partial query by the absence of a character being entered within a period of time, representing a pause by the user. It may be that the pause in entry signifies that the user has entered one search term but has not entered the space key (or other delimiting character) to start entering another term or signifies that the search query is complete but the user has not yet signaled that the search query is complete.

Regardless of the way the partial query is identified, it is transmitted to the search engine 308 (stage 420) for processing. In response to the partial search query, the search engine 308 returns a set of predicted search queries (stage 422) which may be presented to the user (stage 424). One skilled in the art will recognize a number of ways to present the predicted search queries to the user. For example, the predicted search queries might be presented in a drop down menu. Regardless of the manner in which the predicted queries are presented to the user, the user may select one of the queries if the user determines that one of the predicted queries matches a desired query. If the user selects one of the predicted search queries (stage 426), the predicted query is transmitted to the search engine 308 as a search request (stage 430). After the search results generated from the search request are received (stage 432), they may be presented and selected for further study as described above (stages 414 through 419).

In an embodiment of the invention, the search engine 308 may optionally return predicted search results (stage 434). This activity may overlap with receiving predicted queries and is so indicated by the dashed line in FIG. 4 from stage 420 to stage 434. The received predicted search results may be presented and selected as described earlier (stages 414 through 419).

Accordingly, the user may have predicted search results presented that match a desired query before the user finishes entering the query. In such situations, the query processing latency as viewed by the user is effectively reduced to less than zero because the user did not have to complete the query to obtain the desired results.

Figure 5:
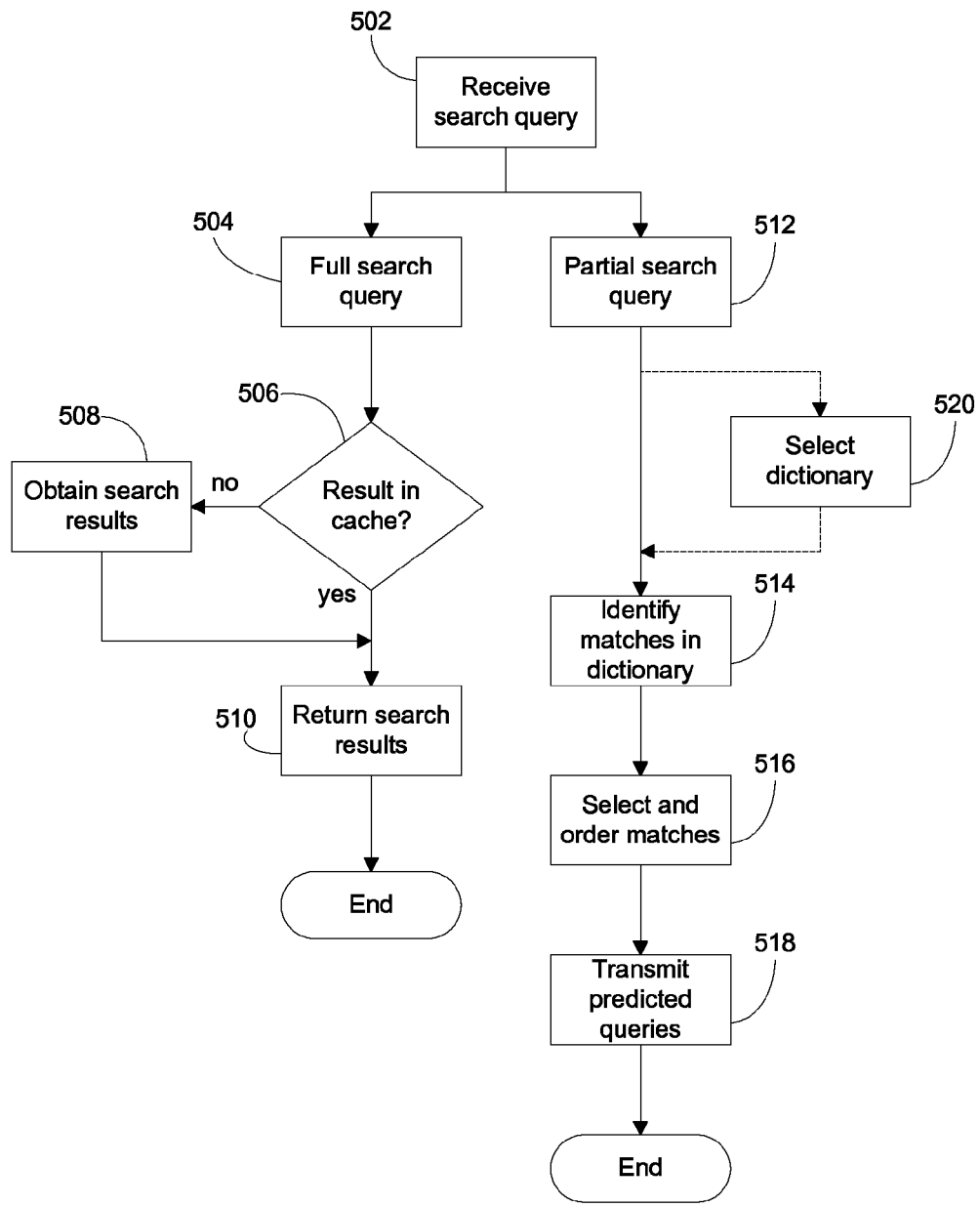
FIG. 5 is a flow chart of tasks handled by a search engine.

An embodiment of the invention for receiving queries or partial queries and returning search results and predicted queries is illustrated in FIG. 5. After a query is received (stage 502) at a search engine 308, for example, it is identified as either a full search query (stage 504) or a partial search query (stage 512). If the search query is a final search query, it is determined whether search results corresponding to the search query are present in a cache of the search engine (stage 506). For example, the search results may have been cached from an earlier search on the same query. The earlier search may be as a result of a final query or a predicted query (as described below). Referring back to FIG. 3, the cached search results could be in the query server 310 or the cache 338. Typically, results stored in a cache will be available more quickly (i.e., results are presented with lower latency as viewed from the perspective of the user) than producing those search results from a search of the search engine's document database. Producing search results from a cache also reduces the workload of the search engine, which improves overall performance of the search engine. If the results of the search query are not present in any cache, then the search results are obtained by searching the inverse document index 334 (stage 508). Once the results are obtained from the cache or document index, they are sent to the client system 120 (stage 510).

If a partial query is identified (stage 512), then an attempt is made to anticipate queries that the user might be in the process of entering based on that partial query. In one embodiment, the partial query is compared against entries in a dictionary to generate possible queries (stage 514). For example, the partial query receipt, processing and response module 320 (of FIG. 3) could send the partial query to the auto-complete server 312. The auto-complete server 312 could return a set of entries from the dictionary that match the partial query. From the returned set, some matches could be selected and placed in an order based on a metric or score representative of how likely each entry is to match the user's search query (stage 516). This selecting and ordering is described in more detail below. The selected and ordered matches may be sent to the client system 120 as predicted queries (stage 518). In some embodiments, matching entries are selected based on a metric or score, but are ordered based on other criteria, such as alphabetical order.

In an embodiment of the invention, there may be more than one dictionary against which to match partial queries. The dotted lines in FIG. 5 represent an alternate path between stage 512 and stage 514, where a specific dictionary (or a plurality of specific dictionaries) may be selected (stage 520). Multiple dictionaries may allow for personalization of the matched entries in a dictionary. For example, a user profile may identify one or more categories of information that are of interest to a respective user. Each dictionary could correspond to one or more categories of users or categories of interest (e.g., sports, music, news, finance, food, popular culture, etc.).

Figure 6:
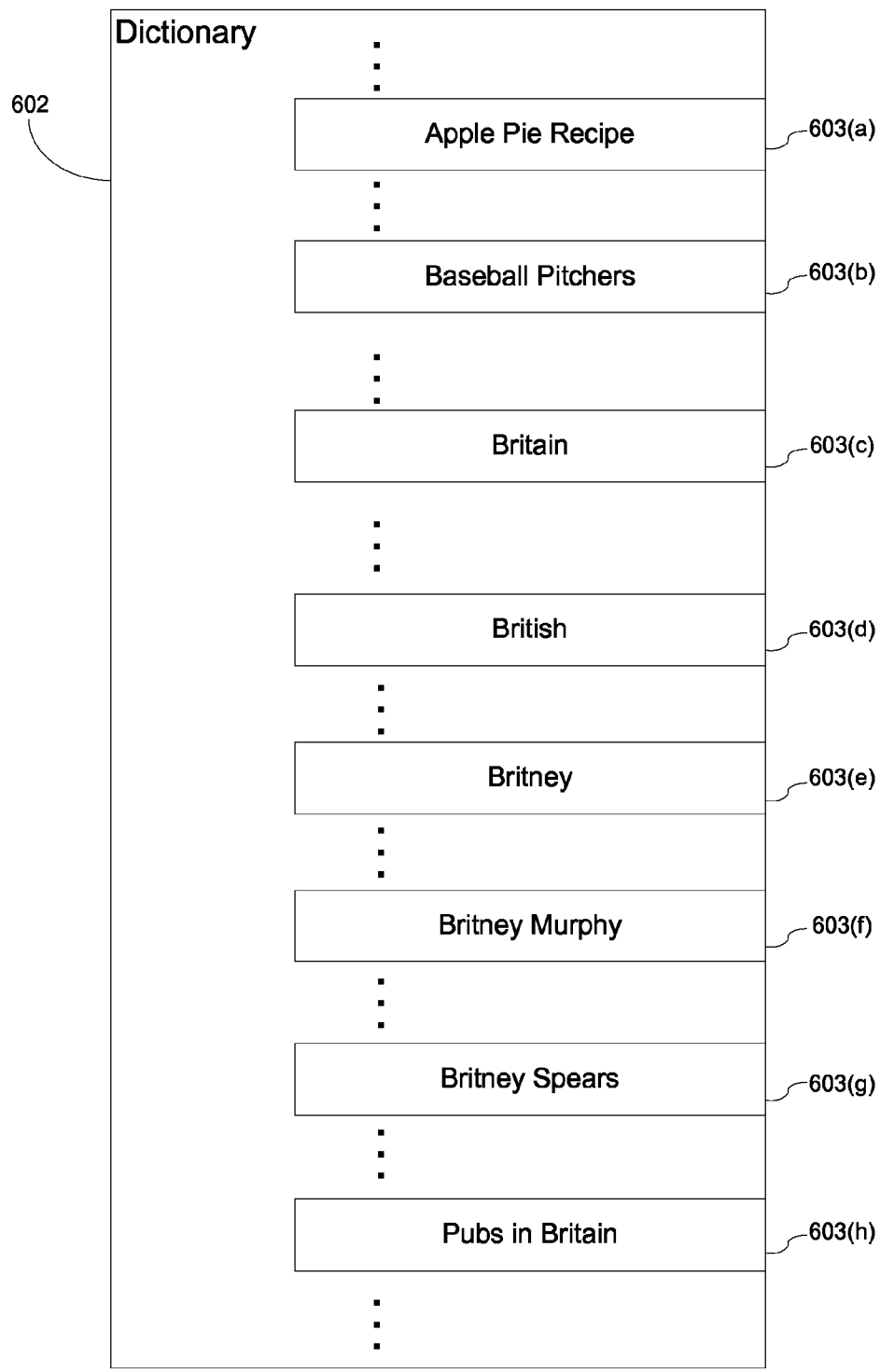
FIG. 6 is a block diagram of a dictionary of search queries.

FIG. 6 schematically depicts an exemplary dictionary 602. A dictionary 602 according to an embodiment of the invention may be created from previously submitted search queries. These previous search queries could consist not only of queries submitted by the user, but also of queries submitted by a community of users. Thus, the entries in the dictionary 602 would tend to reflect commonly submitted searches as well as those recent search requests that might still be stored in a cache somewhere in the searching system 300. As noted above, if a search request is stored in a cache, the search results may be more quickly presented to the user than if the search required searching the document database 336 from scratch.

The dictionary 602 includes a number of exemplary dictionary entries 603(*a*) through 603(*h*). Each of the entries 603 includes a term portion 604 and a popularity value 605. The term portion 604 stores the single or multiword terms which could be identified as a possible query search term. The popularity value 605 is a value that indicates how popular the associated term portion 604 may be at any given moment in time. The popularity value 605 can be used to rank the predicted search queries according to current popularity and therefore increase the likelihood that the user will be presented with an intended query term.

For the purposes of illustration, only a few exemplary entries are shown. And, while the entries 603 in dictionary 602 are shown in alphabetical order, the entries may be stored in any order. Furthermore, while the exemplary dictionary 602 includes both single search term entries and multiple search term entries, dictionaries consisting of entries of either or both are also contemplated by embodiments of the invention.

Consider matching "Bri" as a partial search query against the entries 603 in dictionary 602. In one embodiment, matches in the dictionary 602 are identified if a respective dictionary entry begins with the same letters as the partial search query. Using this criteria, the partial query "Bri" would match entry 603(*c*) "Britain", entry 603(*d*) "British", entry 603(*e*) "Britney", entry 603(*f*) "Britney Murphy", and entry 603(*g*) "Britney Spears", but would not match "Apple Pie Recipe". In this example, capitalization is taken into account, but in another embodiment would not be.

Consider another example where "Britney" is the partial search query. In this example, the matches could include entry 603(*e*) "Britney", entry 603(*f*) "Britney Murphy", and entry 603(*g*) "Britney Spears". As more characters are included in the partial search query, the number of dictionary entries matching the partial search query may diminish, increasing the likelihood that the predicted search query will match the user's desired query. However, there is a tradeoff between waiting for more information to be included in the partial search query (and thus increasing the likelihood that the predicted search query will match the desired search query)

against more quickly returning a larger number of search queries, many of which may not be the desired search query.

In another embodiment, entries 603 matched to a partial search query in the dictionary 602 are identified if any search term in the entry begins with the same letters as the partial search query. For example, if the partial search query was "Bri" this partial query would match entry 603(c) "Britain", entry 603(d) "British", entry 603(e) "Britney", entry 603(f) "Britney Murphy", and entry 603(g) "Britney Spears" as in the previous example, but would also match 603(h) "Pubs in Britain". In entry 603(h), the third search term "Britain" was matched and thus the entire query is considered a match. Although only a few exemplary matching embodiments have been discussed, one of ordinary skill in the art will recognize any number of possible ways to match dictionary entries.

Referring back to FIG. 5, once the set of matching entries has been identified (stage 514), the matching entries are selected and ordered (stage 516) prior to transmission to the client system 120. Any number of selection and ordering strategies are contemplated as embodiments of the invention. For example, all matches could be selected and then ordered in alphabetical order. In another embodiment, the N most popular searches from all of the matched entries could be selected and presented in order of popularity. In another embodiment, the N most likely results could be selected which most closely match the user's partially entered query, based on a predefined matching metric (which might also take into account a user profile).

Figure 7:
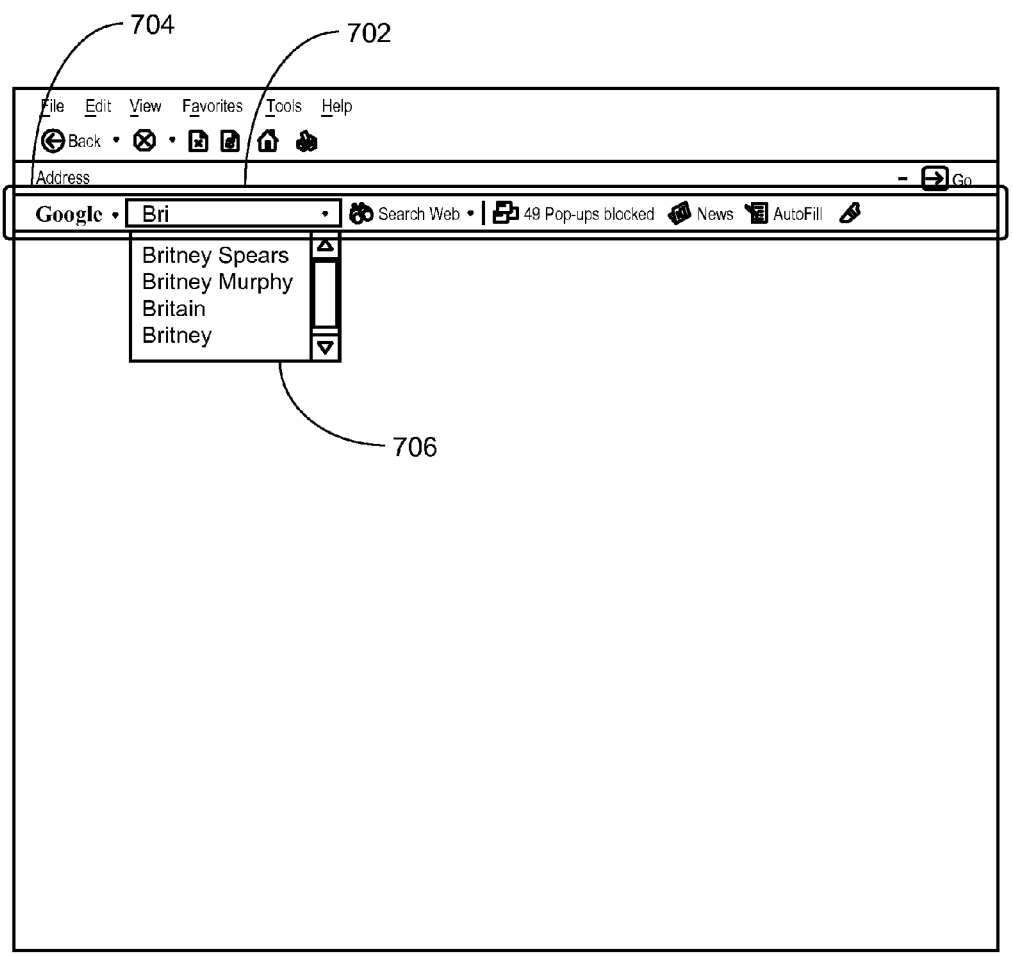
FIG. 7 depicts a listing of predicted search queries.

FIG. 7 illustrates one possible embodiment of the invention where "Bri" was entered as a partial search query in a browser toolbar. In FIG. 7, the user enters text into a search entry box 702 in a browser tool bar 704. Referring to both FIG. 3 and FIG. 7, the partial query "Bri" is monitored and may be sent by the search assistant 304 though communications network 306 to query server 310. The client module 316 may receive the partial query which is then routed to the partial query, receipt processing and response module 320. The partial query receipt, processing and response module 320 sends the partial query to auto-complete server 312 which may return matches against a dictionary 330 which satisfy predefined matching criteria such as the first letters of the partial query matching the first letters of the dictionary entries. The auto-complete server may return a set of matches similar to ones as described above in an earlier example: 603(c) "Britain"; entry 603(d) "British"; entry 603(e) "Britney"; entry 603(f) "Britney Murphy"; and entry 603(g) "Britney Spears". The partial query receipt, processing and response module 320 could receive those matches and use information in the query log 324, in the cache 338 itself, or in the dictionary 330 to determine the popularity of each of those matches.

For the purposes of this example, consider the popularity ranking to be, in decreasing order of popularity: "Britney Spears"; "Britney Murphy"; "Britain"; "Britney"; and "British". Also, for this example, the partial query receipt, processing and response module 320 is configured to return only the top four queries in popularity. By accounting for popularity, the search engine 308 may be able to take into account popularity spikes due to such reasons as breaking news issues or popularity fads. The partial query receipt, processing and response module 320 would return the selected and ordered set of: "Britney Spears"; "Britney Murphy"; "Britain"; and "Britney". This set could then be presented to the user as shown in select box 706 of FIG. 7.

In an embodiment, the query log 324 could contain a popularity ranking for each of the queries stored in it. In another embodiment, the query log 324 could contain information indicating when in time the query was submitted. In this way, an embodiment could select and order the matches based on when the query was last submitted. One could order the matches such that the most recently requested queries are presented to the user before queries less recently submitted. Other embodiments could be envisioned including selecting the most popular N matches as determined from the query log 324 and ordering them based on which queries were most recently submitted. One of ordinary skill in the art would recognize many different ways to select and order the matching entries. In some alternate embodiments, information about the popularity of queries whose search results have been cached is stored in the cache itself. For instance, the cache may maintain a "reuse count" indicating the number of times each entry in the cache has been re-used. The reuse count for each specified entry may be returned by the cache in response to a re-use count inquiry. In such embodiments, a query log 324 might not be used for selecting and/or ordering predicted search queries.

In yet another embodiment, user profile information about users is stored in user information processing module 322. The user information processing module 322 might contain such information as the user having a preferred interest in entertainers. As such, the entries "Britney Spears" and "Britney Murphy" would be given more weight in the matching, selecting, and ordering than other terms. By use of information which might be contained in (or accessible by) the user information processing module 322, the search engine 308 might be able to further increase the likelihood that the predicted search queries match the user's desired query.

If the predicted search queries present in select box include the user's desired query, the user can select that query using an appropriate keyboard, mouse or other input. Imagine that the user's desired search query was "Britney Spears". The user could select the "Britney Spears" entry in select box 706 and this would be transmitted to the search engine as a final query.

In yet another embodiment of the invention, some or all of the search results from the predicted queries are cached in the search engine such that when the user selects one of the predicted queries in for example, select box 706, the search engine is not required to search the document database. This embodiment would serve to anticipate possible final queries and store the search results of those queries in a cache so that they are available more quickly than if the search engine was required to complete the search from scratch. An embodiment of this type is described next.

Figure 8:
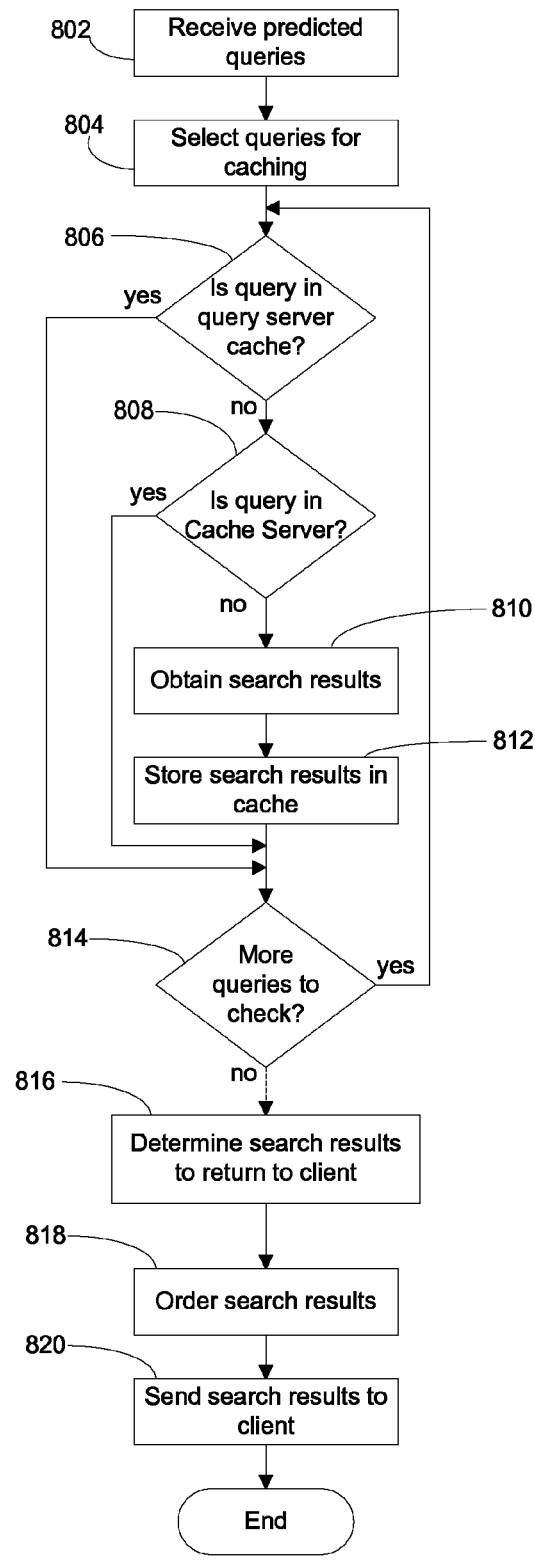
FIG. 8 is a flow chart of a process for caching search results corresponding to predicted search queries.

Referring to FIG. 8, the predicted queries that are generated as a result of stage 516 of FIG. 5 are received (stage 802). In another embodiment, the received set could be the matches identified at stage 514 prior to selecting and reordering. Out of the received set, certain of the queries are selected to have their search results cached in anticipation that those predicted queries might be selected by the user as the final query (stage 804). Any number of factors may be used to select queries for having their results cached. Identifying which search results to cache could be done similarly to identifying which queries to transmit to the user as identified in stages 516 and 518 of FIG. 5. That is, one could use the popularity of a query or how recently in time a query was accessed to determine which queries' search results to cache. For example, one could select the top N most popular queries from the set and cache the search results of the most recently accessed queries in that subset, or simply cache the search results of the N most popular queries. In another embodiment, results could be cached for those queries which most closely match a predefined matching metric (which might also take into account a user profile).

Once the queries are selected, they are checked against current cache entries (stage 806 and stage 808). In an exemplary embodiment, a cache exists in the query server 310 and in the cache server 338. One of ordinary skill would recognize that a single cache or multiple caches may be used in other embodiments. Referring to both FIGS. 3 and 7, checks are initially made against the predicted query results cache 328 in the query server to determine if the results for the query are present (stage 806). If the query results are not in the predicted query results cache 328, then the cached results 342 in the cache 338 are checked (stage 808) to determine whether the query search results are present. If the query search results are not present, then the search results for that query are obtained by using, for example, the query processing controller 314 and searching the document database (stage 810). The search results may be stored in one or more caches for later access (stage 812). If there are more queries to check against the caches (stage 814), then cache checking continues (stage 806). If the search results for a query are found in a cache at stage 806 or stage 808, then it would need to be determined whether any additional queries needed to be checked (stage 814).

In some embodiments, it may be that certain of the predicted search results are returned to the client and presented to user during processing of the partial query in the hopes that included within the predicted search results is the desired search result. In such a situation, the user would be receiving a desired search result even more quickly than described earlier because the user would not need to spend the time in choosing one of the predicted queries. In any event, it makes it more likely that the desired search results are presented to the user prior to completion of the final query.

Such embodiments may be represented, for example, by stages 816 through 820 of FIG. 8. At stage 816, it is determined which search results to return to the client system 120. This may be the same or a subset of the search results for the queries selected for caching and may be based on any number of factors previously described, for example, most recently accessed, most frequently requested, most closely matching a predefined matching metric, or any combination thereof. Those of ordinary skill in the art would recognize many different factors. Similarly, stage 818 determines an order for the selected searches. The ordering of the searched may also be based on any number of factors including those previously discussed. Finally, at stage 820 the search results are sent to the client, and subsequently presented to the user.

Although the stages are shown in a particular order, one of ordinary skill would recognize that they need not necessarily be performed in that order. For example, checking and obtaining search results could be overlapped with identifying, ordering, and sending search results to the client.

Figure 9:
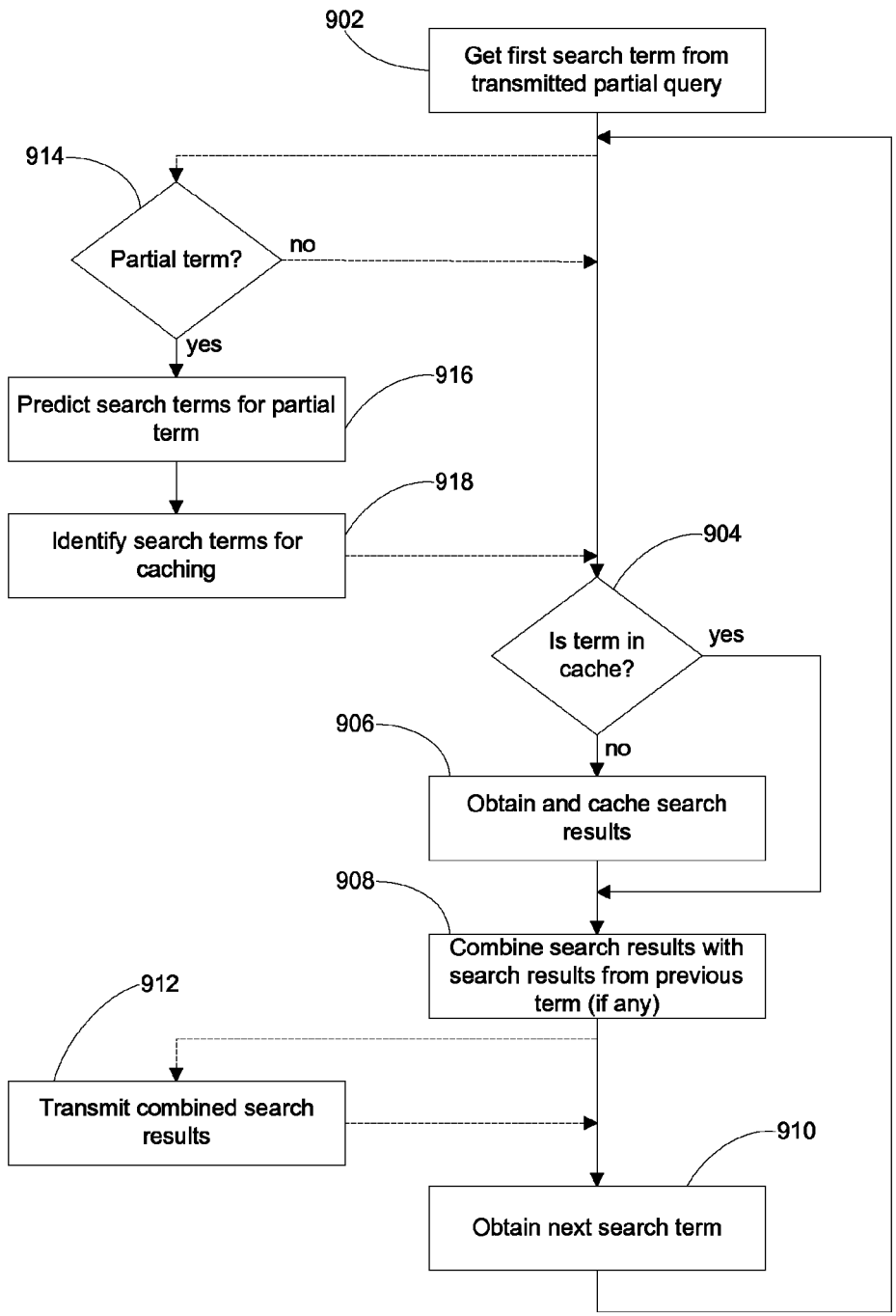
FIG. 9 is a flow chart of a process for processing a search query having a plurality of search terms.

In another embodiment, the anticipated search results that are cached are based on individual query terms, including anticipated search terms, and are not based on executions of anticipated multi-term queries. As more query terms are entered, predicted search results are generated based on the search results generated for the individual query terms. For example, this might be done by determining which documents in the (previously generated) respective search result sets fully satisfy the query entered by the user, and for each of those qualifying documents, combining query scoring values (e.g., information retrieval scores) associated with the individual query terms to produce a combined score for each qualifying document that is then used for ordering search results. If the number of qualifying documents is less than a threshold value, the full query is executed by the search engine. FIG. 9 provides an example of this embodiment.

Initially the first search term is obtained from the partial query (stage 902). This search term may be identified in any number of ways, including those described earlier regarding identification of a partial query, such as monitoring when a space or other delimiting character is entered by the user. It is determined whether search results corresponding to the search term are resident in a cache (stage 904). For example, it may be determined whether the search results for the search term are currently in the predicted query results cache 328. Although described as using the predicted query results cache 328, one of ordinary skill in the art would recognize that another embodiment could use the cached results 342 alone or in combination with the predicted query results cache 328.

If the search results for that term are not in cache, then the search results are obtained and cached (stage 906). If the search results for that term are in the cache, then flow bypasses stage 906 and proceeds to the combing stage 908.

If only one search term has been identified and the cache has been checked for the corresponding search results, then the next search term in the partial search query, if any, should be obtained (stage 910). If however, a preceding search term has been addressed, the results of the two search terms are combined to yield a set of search results that is more closely aligned with the multiple terms (stage 908). One way to do this might be to identify which of the documents in the set of results for the first search term are also in the set of results for the second search term to create a combined search results set. This set could be ordered by, for example, combining query scoring values associated with the individual search terms to create a combined score for each document in the set. This process could continue until all of the search terms are included in the combined set. Using this approach might let a search result set be built incrementally while the user is entering the full query. By the time the user has indicated that the query is complete, the combined results might be more quickly available to the user than if the full search was obtained using the document database directly with no prior processing.

In another embodiment, the combined search results are transmitted to the client as each additional search term is encountered (stage 912). This enhancement is shown by the dotted lines to and from stage 912. Accordingly, as the user adds additional search terms, the user may be able to identify a desired result without having to enter all the intended search terms.

An additional embodiment would account for partial terms and is shown via dotted lines in FIG. 9. In this embodiment, flow may proceed from stage 902 to stage 914 for identification of partial terms. If a partial term was received (stage 914) then the techniques described above for predicting search terms from partial search terms would be used to generate a set of predicted search terms (stage 916). From this set of predicted search terms, certain ones could be identified for caching the associated search results (stage 918). Techniques for selecting which predicted search terms to cache may be the same or similar to those described earlier regarding which queries to cache.

Figure 10:
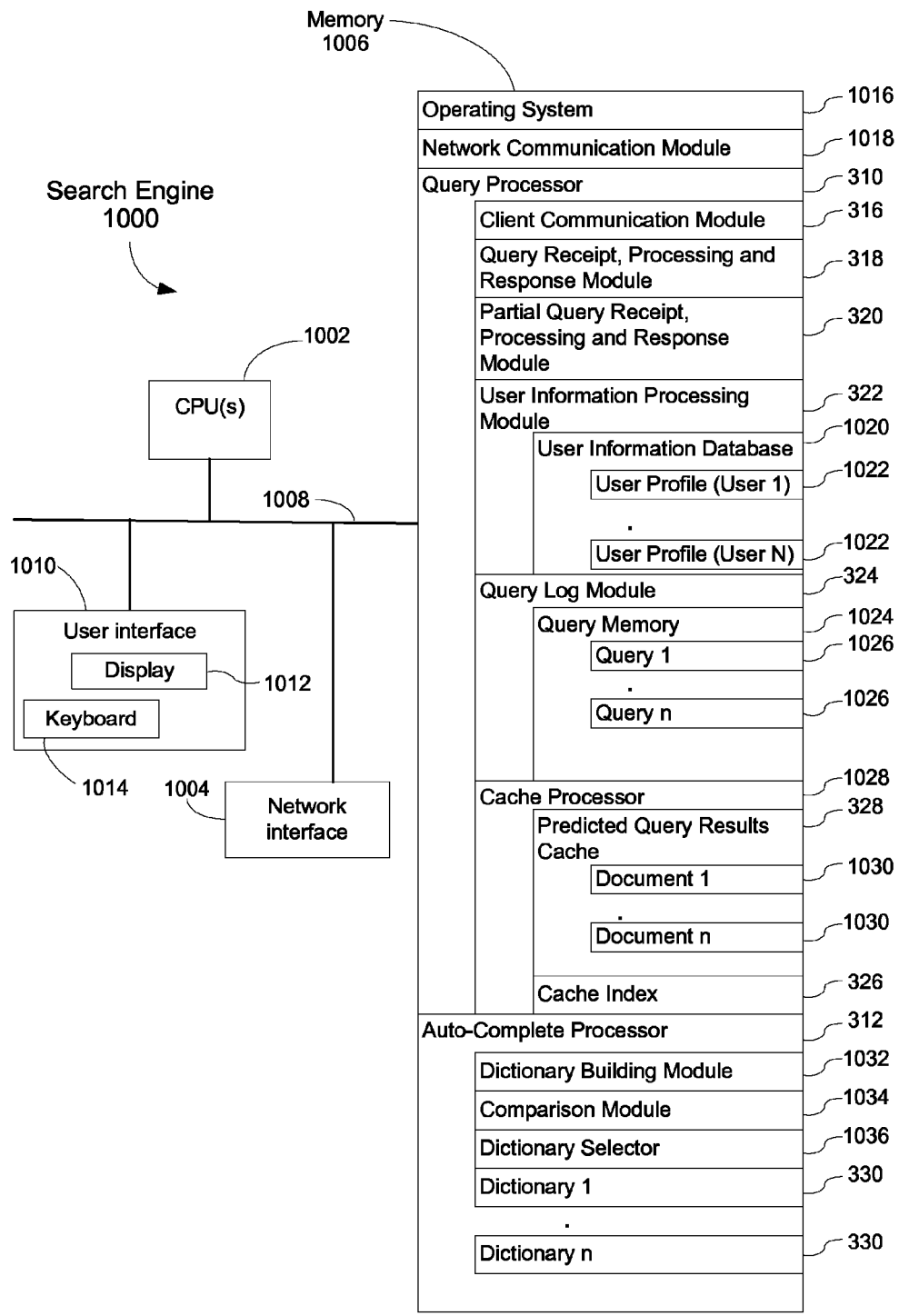
FIG. 10 is a block diagram of a search engine.

Referring to FIG. 10, an embodiment of a search engine 1000 that implements the methods described above includes one or more processing units (CPU's) 1002, one or more network or other communications interfaces 1004, memory 1006, and one or more communication buses 1008 for interconnecting these components. The search engine 1000 may optionally include a user interface 1010 comprising a display device 1012 (e.g., for displaying system status information) and/or a keyboard 1014 (e.g., for entering commands). Memory 1006 may include high speed random access memory and may also include non-volatile memory, such as one or more magnetic or optical storage disks. Memory 1006 may include mass storage that is remotely located from CPU's 1002. The memory 1006 may store:

- an operating system 1016 that include procedures for handling various basic system services and for performing hardware dependent tasks;
- a network communication module (or instructions) 1018 that is used for connecting the search engine 1000 to other computers via the one or more communications network interfaces 1004 (wired or wireless), such as the Internet, other wide area networks, local area networks, metropolitan area networks, and so on;
- a query processor 310 for receiving full or partial queries and returning search results and predicted queries and predicted search results;
- a query log module 324 for storing information about previously submitted queries in a query memory 1024, which includes information for a plurality of previous queries 1026 such as the last time the query was submitted or how frequently the query is submitted over time;
- a cache processor 1028 for storing the search results of previously submitted queries in a predicted query results cache 328, the cache for storing a plurality of documents 1030, and a cache index 326 used to assist in determining locations of documents in the cache; and
- an auto-complete server 312 for receiving a partial query and returning predicted search terms or queries.

In some embodiments, the query processor 310 does not include a cache processor 1028. In some embodiments, the query processor 310 does not include a query log module 324.

In some embodiments, the query processor 310 includes: a client communications module 316 for receiving and transmitting information; a query receipt, processing and response module 318 for receiving and responding to full search queries; a partial query receipt, processing and response module 320 for receiving and responding to full search queries; a user information and processing module 322 for accessing user information from a user information database 1020, which includes a respective user profile 1022 for a plurality of users. In some embodiments, the query processor 310 includes a subset of these modules. In some embodiments, the query processor 310 includes additional modules.

In some embodiments, the auto-complete server 312 includes a dictionary building module 1032 for creating various dictionaries from previously submitted queries, a comparison module 1034 to compare partial search terms or queries to the entries in various dictionaries, a dictionary selector 1036 to select one or more dictionaries for the comparison module to use, and one or more dictionaries 330 including entries of previously submitted search terms and/or queries.

FIG. 10 depicts the internal structure of a search engine 1000 in one embodiment. It should be understood that in some other embodiments the search engine 1000 may be implemented using multiple servers so as to improve its throughput and reliability, or cost, other factors. For instance the auto-complete server 312 could be implemented on a distinct server that communications with and works in conjunction with other ones of the servers in the search engine 1000.

Figure 11:
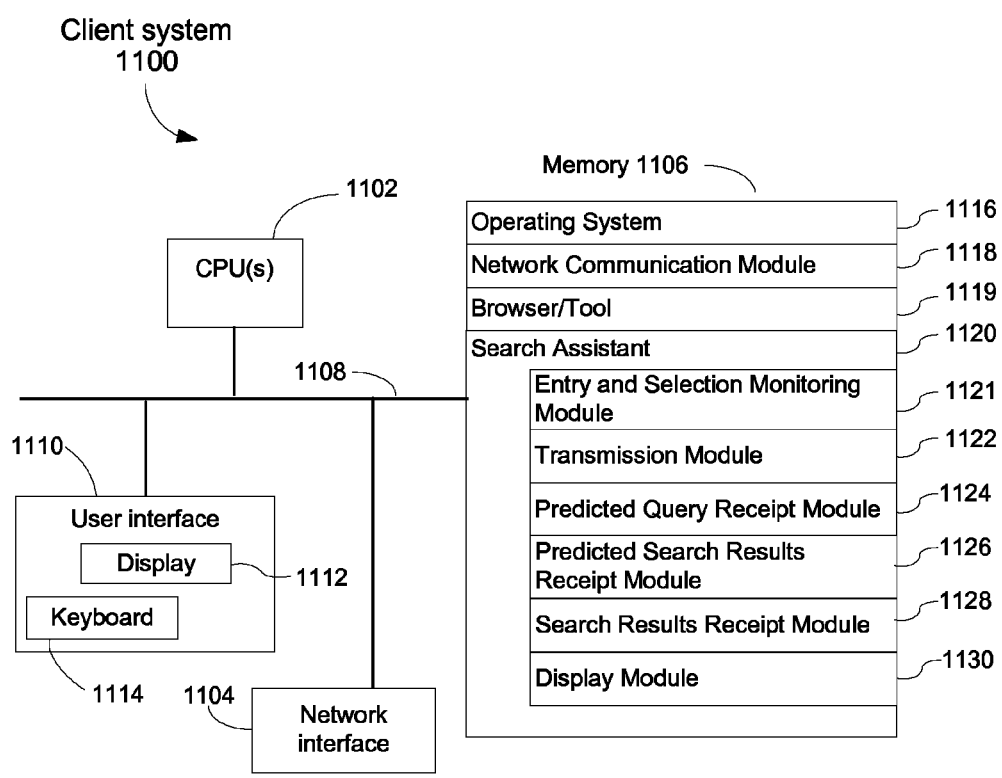
FIG. 11 is a block diagram of a client system.

Referring to FIG. 11, an embodiment of a client system 1100 that implements the methods described above includes one or more processing units (CPU's) 1102, one or more network or other communications interfaces 1104, memory 1106, and one or more communication buses 1108 for interconnecting these components. The search engine 1100 may optionally include a user interface 1110 comprising a display device 1112 and/or a keyboard 1114. Memory 1106 may include high speed random access memory and may also include non-volatile memory, such as one or more magnetic or optical storage disks. Memory 1106 may include mass storage that is remotely located from CPU's 1102. The memory 1006 may store:

- an operating system 1116 that include procedures for handling various basic system services and for performing hardware dependent tasks;
- a network communication module (or instructions) 1118 that is used for connecting the client system 1100 to other computers via the one or more communications network interfaces 1104 (wired or wireless), such as the Internet, other wide area networks, local area networks, metropolitan area networks, and so on; and
- a browser/tool 1119 for interfacing with a user to input search queries, and for displaying search results; and
- a search assistant 1120.

In some embodiments, the search assistant 1120 is separate from the browser/tool 1119, while in other embodiments the search assistant is incorporated in the browser/tool 1119.

The search assistant 1120 includes: an entry and selection monitoring module 1121 for monitoring the entry of search queries and selecting partial queries and final queries for transmission to the search engine; a transmission module 1122 for transmitting the partial search queries to the search engine; a predicted query receipt module 1126 for receiving predicted queries; a predicted search results receipt module 1128 for receiving predicted search results; and optionally, a search results receipt module 1128 for receiving search results. The transmission of final (i.e., completed) queries, receiving search results for completed queries, and displaying such results may be handled by the browser/tool 1119, the search assistant 1120, or a combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method performed at a server system for processing a search query, comprising:
   - receiving at the server system the search query from a search requestor at a client system that is distinct from the server system; and
   - at the server system, responding to receiving the search query, including:
     - determining whether the search query is a partial search query or a final search query; wherein,
     - when the search query is deemed to be a partial search query:
       - (A) predicting a plurality of predicted queries based upon the search query;
       - (B) selecting one or more predicted queries in the plurality of predicted queries based, at least in part, on how recently each of the predicted queries was previously submitted to the server system;
       - (C) obtaining search results corresponding to the one or more selected predicted queries, prior to receiving a selection of any predicted query in the plurality of predicted queries from the search requestor, and (D) transmitting (i) the one or more selected predicted queries, and (ii) the search results corresponding to the one or more selected predicted queries to the search requestor at the client system;

when the search query is deemed to be a final search query:
determining whether a server system cache includes search results corresponding to the final search query, wherein
when the server system cache includes search results corresponding to the final search query, transmitting to the search requestor at the client system, from the server system, the search results in the document cache that correspond to the final search query, and
when the server system cache does not include search results corresponding to the final search query:
(i) obtaining search results corresponding to the final search query from an inverse document index, and
(ii) transmitting to the search requestor at the client system, from the server system, the search results corresponding to the final search query from the inverse document index, wherein at least the predicting (A), selecting (B), and obtaining (C) are executed before obtaining, at the server system, an affirmation, by the search requestor, of a request for executing the search query.

2. The method of claim 1 further comprising: predicting the plurality of predicted queries from a collection of queries previously received from a community of users.

3. The method of claim 1, wherein the search query is deemed to be a partial search query and includes a complete search term.

4. The method of claim 1, wherein the search query is deemed to be a partial search query, the method further comprising:
comparing one or more characters of the search query to entries in a dictionary; and
creating the plurality of predicted queries from one or more of the entries in the dictionary whose entries include the at least one or more characters.

5. The method of claim 4, wherein the plurality of predicted queries is created from entries in the dictionary whose entries begin with the at least one or more characters.

6. The method of claim 4, further comprising:
selecting the dictionary from a plurality of dictionaries.

7. The method of claim 6, further comprising:
selecting the dictionary based on information obtained from a user profile of the search requestor.

8. The method of claim 1, wherein the selecting (B) includes selecting and ordering the predicted queries based, at least in part, on how recently each of the predicted queries was previously submitted to the server system.

9. The method of claim 1, further comprising obtaining search results corresponding to the search query, wherein the search results corresponding to the one or more predicted search queries are independent from the search results corresponding to the search query.

10. A server system, comprising:
one or more hardware processors;
hardware memory; and
one or more programs stored in the memory for execution by the one or more processors, the one or more programs comprising instructions for:
receiving at the server system a search query from a search requestor at a client system that is distinct from the server system; and
at the server system, responding to receiving the search query, including:
determining whether the search query is a partial search query or a final search query; wherein,
when the search query is deemed to be a partial search query:
(A) predicting a plurality of predicted queries based upon the search query;
(B) selecting one or more predicted queries in the plurality of predicted queries based, at least in part, on how recently each of the predicted queries was previously submitted to the server system;
(C) obtaining search results corresponding to the one or more selected predicted queries, prior to receiving a selection of any predicted query in the plurality of predicted queries from the search requester and
(D) transmitting (i) the one or more selected predicted queries, and (ii) the search results corresponding to the one or more selected predicted queries to the search requestor at the client system;

when the search query is deemed to be a final search query:
determining whether a server system cache includes search results corresponding to the final search query, wherein
when the server system cache includes search results corresponding to the final search query, transmitting to the search requestor at the client system, from the server system, the search results in the document cache that correspond to the final search query, and
when the server system cache does not include search results corresponding to the final search query:
(i) obtaining search results corresponding to the final search query from an inverse document index, and
(ii) transmitting to the search requestor at the client system, from the server system, the search results corresponding to the final search query from the inverse document index, wherein at least the predicting (A), selecting (B), and obtaining (C) are executed before obtaining, at the server system, an affirmation, by the search requestor, of a request for executing the search query.

11. The server system of claim 10, the one or more programs further comprising instructions for:
predicting the plurality of predicted queries from a collection of queries previously received from a community of users.

12. The server system of claim 10, wherein the search query includes a complete search term.

13. The server system of claim 10, wherein the search query is deemed to be a partial search query, the one or more programs further comprising instructions for:
comparing one or more characters of the portion of the search query to entries in a dictionary; and
creating the plurality of predicted queries from one or more of the entries in the dictionary whose entries include the at least one or more characters.

14. The server system of claim 13, wherein the plurality of predicted queries is created from entries in the dictionary whose entries begin with the at least one or more characters.

15. The server system of claim 13, the one or more programs further comprising instructions for:
selecting the dictionary from a plurality of dictionaries.

16. The server system of claim 15, the one or more programs further comprising instructions for:

selecting the dictionary based on information obtained from a user profile of the search requestor.

17. The server system of claim 10, wherein the instructions for selecting (B) include instructions for selecting and ordering the predicted queries based, at least in part, on how recently each of the predicted queries was previously submitted to the server system.

18. The server system of claim 10, the one or more programs further comprising instructions for obtaining search results corresponding to the search query, wherein the search results corresponding to the one or more predicted search queries are independent from the search results corresponding to the search query.

19. A non-transitory computer readable storage medium storing one or more programs configured for execution by a computer, the one or more programs comprising instructions for:
  receiving at a server system a search query from a search requestor at a client system that is distinct from the server system; and
  at the server system, responding to receiving the search query, including:
    determining whether the search query is a partial search query or a final search query; wherein,
  when the search query is deemed to be a partial search query:
    (A) predicting a plurality of predicted queries;
    (B) selecting one or more predicted queries in the plurality of predicted queries based, at least in part, on how recently each of the predicted queries was previously submitted to the server system;
    (C) obtaining search results corresponding to the one or more selected predicted queries, prior to receiving a selection of any predicted query in the plurality of predicted queries from the search requester and
    (D) transmitting (i) the one or more selected predicted queries, and (ii) the search results corresponding to the one or more selected predicted queries to the search requestor at the client system;
  when the search query is deemed to be a final search query:
    determining whether a server system cache includes search results corresponding to the final search query, wherein
      when the server system cache includes search results corresponding to the final search query, transmitting to the search requestor at the client system, from the server system, the search results in the document cache that correspond to the final search query, and
      when the server system cache does not include search results corresponding to the final search query:
        (i) obtaining search results corresponding to the final search query from an inverse document index, and
        (ii) transmitting to the search requestor at the client system, from the server system, the search results corresponding to the final search query from the inverse document index,
      wherein at least the predicting (A), selecting (B), and obtaining (C) are executed before obtaining, at the server system, an affirmation, by the search requestor, of a request for executing the search query.

20. The non-transitory computer readable storage medium of claim 19, wherein the one or more programs further comprising instructions for:
  predicting the plurality of predicted queries from a collection of queries previously received from a community of users.

21. The non-transitory computer readable storage medium of claim 19, wherein the search query is deemed to be a partial search query and includes a complete search term.

22. The non-transitory computer readable storage medium of claim 19 wherein the search query is deemed to be a partial search query, the one or more programs further comprising instructions for:
  comparing one or more characters of the search query to entries in a dictionary; and
  creating the plurality of predicted queries from one or more of the entries in the dictionary whose entries include the at least one or more characters.

23. The non-transitory computer readable storage medium of claim 22, wherein the plurality of predicted queries is created from entries in the dictionary whose entries begin with the at least one or more characters.

24. The non-transitory computer readable storage medium of claim 22, wherein the one or more programs further comprise instructions for selecting the dictionary from a plurality of dictionaries.

25. The non-transitory computer readable storage medium of claim 24, the one or more programs further comprising instructions for selecting the dictionary based on information obtained from a user profile of the search requestor.

26. The non-transitory computer readable storage medium of claim 19, wherein the selecting (A) includes ordering the predicted queries based, at least in part, on how recently each of the predicted queries was previously submitted to the server system.

27. The non-transitory computer readable storage medium of claim 19, the one or more programs further comprising instructions for obtaining search results corresponding to the search query, wherein the search results corresponding to the one or more predicted search queries are independent from the search results corresponding to the search query.

* * * * *